United States Patent [19]

Bookbinder

[11] Patent Number: 4,817,977
[45] Date of Patent: Apr. 4, 1989

[54] STAND FOR MOTORCYCLE

[76] Inventor: David Bookbinder, 448 East Annette, Phoenix, Ariz. 85022

[21] Appl. No.: 88,794

[22] Filed: Aug. 24, 1987

[51] Int. Cl.⁴ .............................................. B62H 1/06
[52] U.S. Cl. .................................... 280/304; 180/219; 192/76; 254/98; 254/DIG. 2; 280/766.1; 464/37
[58] Field of Search .................. 280/763.1, 766.1, 293, 280/304; 180/219; 192/76, 56 R; 464/35, 37; 254/DIG. 2, 420, 98, 419; 340/520, 679, 681

[56] References Cited

U.S. PATENT DOCUMENTS

| 3,458,173 | 7/1969 | Kornovich et al. | 254/420 |
| 3,523,698 | 8/1970 | Bishop | 280/766.1 |
| 4,533,905 | 8/1985 | Leivenzon et al. | 340/686 |
| 4,635,904 | 1/1987 | Whittingham | 192/56 R |

FOREIGN PATENT DOCUMENTS

| 224267 | 7/1910 | Fed. Rep. of Germany | 280/304 |
| 2459953 | 12/1974 | Fed. Rep. of Germany | 254/DIG. 2 |
| 3433539 | 3/1986 | Fed. Rep. of Germany | 180/219 |
| 15816 | of 1915 | United Kingdom | 192/56 R |

Primary Examiner—David M. Mitchell
Assistant Examiner—Eric Culbreth
Attorney, Agent, or Firm—Don J. Flickinger; Jordan M. Meschkow

[57] ABSTRACT

A housing having a telescopingly extendible and retractable leg is carried by the frame of a motorcycle. A camming mechanism which drives the leg is secured to a reversible motor through a limited torque coupling whereby the extension of the leg is automatically terminated upon firm contact with the ground. Switching circuitry provides that the motor is manually actuated by the operator of the vehicle.

6 Claims, 3 Drawing Sheets

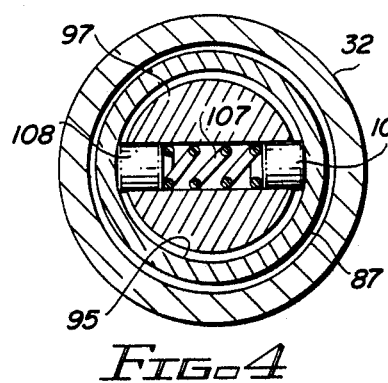
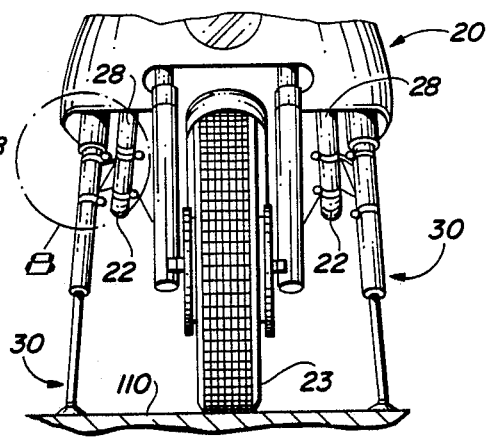
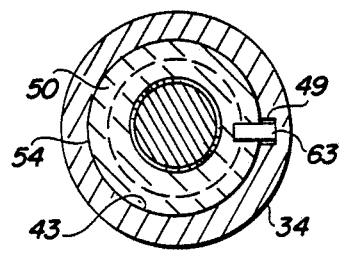
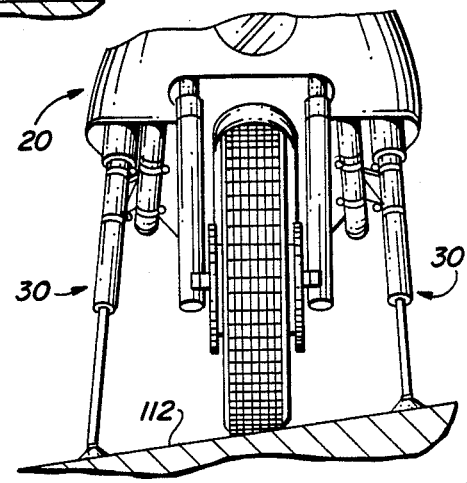
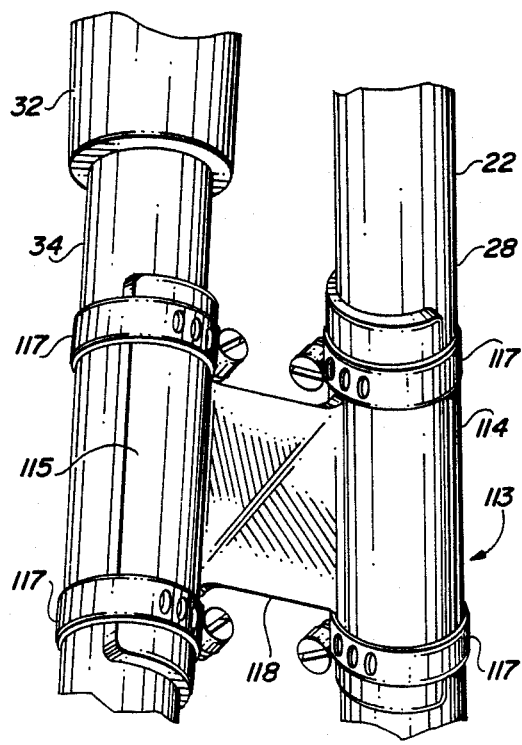
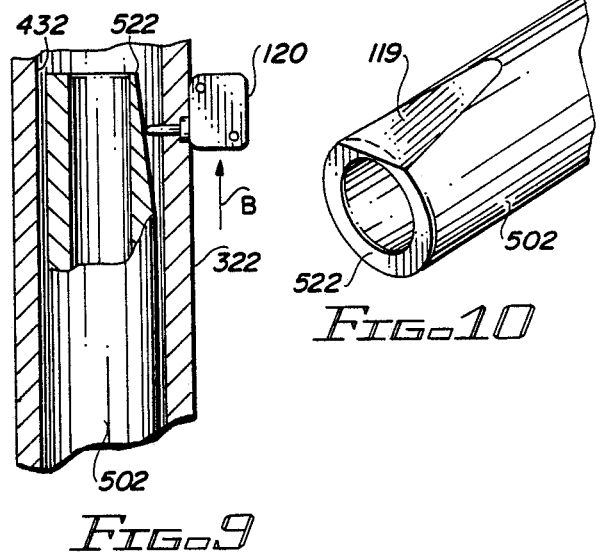
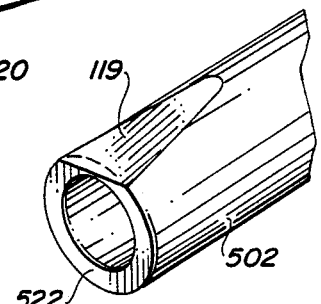

STAND FOR MOTORCYCLE

BACKGROUND OF THE INVENTION

1. Field of the Invention

This invention relates to vehicle stands.

More particularly, the present invention relates to stands of the type especially adapted for righting and supporting a motorcycle or similar vehicle.

In a further and more specific aspect, the instant invention concerns a stand having improvements for ease of use and for ameliorated support.

2. The Prior Art

The prior art is replete with various devices for supporting a motorcycle or like vehicle. Generally referred to as stands, the devices are movable between an operative position and an inoperative position. In the operative position, the stand extends to the ground to support the motorcycle in an upright position. In the inoperative position, the device is spaced from the ground in a stowage configuration.

An exceedingly common and well known device is the traditional kickstand which is manipulated between positions by the foot of the vehicle operator. Typically, the kickstand comprises an elongate rigid shaft which is pivotally affixed to the motorcycle and movable between an elevated position and a lowered position. A detent retains the shaft in either selected position.

For riding, the shaft is raised to a relatively horizontal position. For parking, the shaft is lowered to extend outwardly downward whereby the cycle rests at an angle to the ground. It is therefore necessary, before further use, to force the cycle into a substantially vertical position, mount the seat and raise the kickstand. This represents an arduous task of proportions directly related to the weight of the machine and the strength of the user.

In attempts to alleviate the foregoing problem, the prior art has devised various purported solutions. Exemplary is a kickstand incorporating a fluid actuated mechanism for selectively extending the length of the shaft whereby the motorcycle is raised from the normally angled rest position. However, the device has not recognized nor provided solutions to other attendant problems.

For example, the operator must hold and steady the motorcycle to raise or lower the stand. Since the machine is initially tilted to the side from which the kickstand projects, the rider is confined to mounting from that side. The tilted rest position also contributes to instability of the cycle. Other inadequacies of the prior art will be readily recognized by those having regard for the instant subject matter.

It would be highly advantageous, therefore, to remedy the foregoing and other deficiencies inherent in the prior art.

Accordingly, it is an object of the present invention to provide an improved stand of the type especially adapted for use in combination with motorcycles or the like.

Another object of the invention is the provision of an improved stand for supporting a motorcycle in a substantially vertical position.

And another object of this invention is to provide means for increasing the stability of a parked motorcycle.

Still another object of the invention is the provision of a stand which is entirely manually actuated.

Yet another object of the instant invention is to provide a stand which is operable while the rider is mounted upon the cycle and with both feet continuously remaining upon the ground.

Yet still another object of the invention is the provision of a stand which will automatically compensate for slope or irregularities of the surface upon which the cycle is parked.

And a further object of the invention is to provide motorcycle support means which will allow the rider to mount or dismount from either side.

Still a further object of the immediate invention is the provision of a stand which will inhibit theft of the motorcycle.

Yet a further object of the invention is to provide motorcycle support means which is readily manufacturable either as integral original equipment or as a kit for retrofit to preexisting vehicles.

And yet a further object of the invention is the provision of a stand of the foregoing character which is relatively simple and maintenance free.

SUMMARY OF THE INVENTION

Briefly, to achieve the desired objects of the instant invention in accordance with a preferred embodiment thereof, first provided is a housing which is securable to a motorcycle or like apparatus. A leg, having a free end for contacting the surface upon which the motorcycle rests, is extensively carried by the housing. Cam means, responsive to a drive means, alternately moves the leg in an extending direction and in a retracting direction. The drive means transmits a drive force of predetermined maximum value to the cam means. Preferably, the maximum value of the drive force is less than the force required to lift the motorcycle from the support surface.

In accordance with a further embodiment of the invention, there is provided retraction stop means for limiting the movement of the leg in the retracting direction. The retraction stop means includes energy storage means for receiving energy in response to movement of the leg in the retracting direction. The energy creates a progressively increasing counter-force opposing the drive force of the drive means thereby ceasing movement of the leg when substantial equilibrium is reached between the driving force and the counter-force. The counter force assists the drive means to initiate movement of the leg in the extending direction. Similarly functioning extension limit means are also provided.

In a specific embodiment, the drive means includes a frictionally engaged coupling pair having an element drivingly engaged with a reversible motor and a complemental element drivingly engaged with the cam means. More specifically, one of the elements includes a bore having a cylindrical surface while the other of the elements includes a friction element and biasing means for urging the friction element into contact with the cylindrical surface.

BRIEF DESCRIPTION OF THE DRAWINGS

The foregoing and further and more specific objects and advantages of the instant invention will become readily apparent from those skilled in the art from the following detailed description of preferred embodiments thereof taken in conjunction with the drawings in which:

FIG. 4 is a horizontal sectional view taken along the line 4—4 of FIG. 2;

FIG. 5 is a horizontal sectional view taken along the line 5—5 of FIG. 2;

FIG. 6 is a fragmentary front elevation view of the motorcycle of FIG. 1 and specifically illustrating the manner in which the motorcycle is supported upon substantially level ground by a pair of stands constructed in accordance with the teachings of the instant invention;

FIG. 7 is a view generally corresponding to the view of FIG. 6 and illustrating the motorcycle supported upon sloping ground;

FIG. 8 is an enlarged fragmentary perspective view taken from within the broken outline circle designated 8 in FIG. 6;

FIG. 9 is a fragmentary portion, partly in section, of an alternate embodiment of the instant invention;

FIG. 10 is a perspective view of the portion of the inner member seen in FIG. 9.

DETAILED DESCRIPTION OF THE PREFERRED EMBODIMENTS

Figure 1:
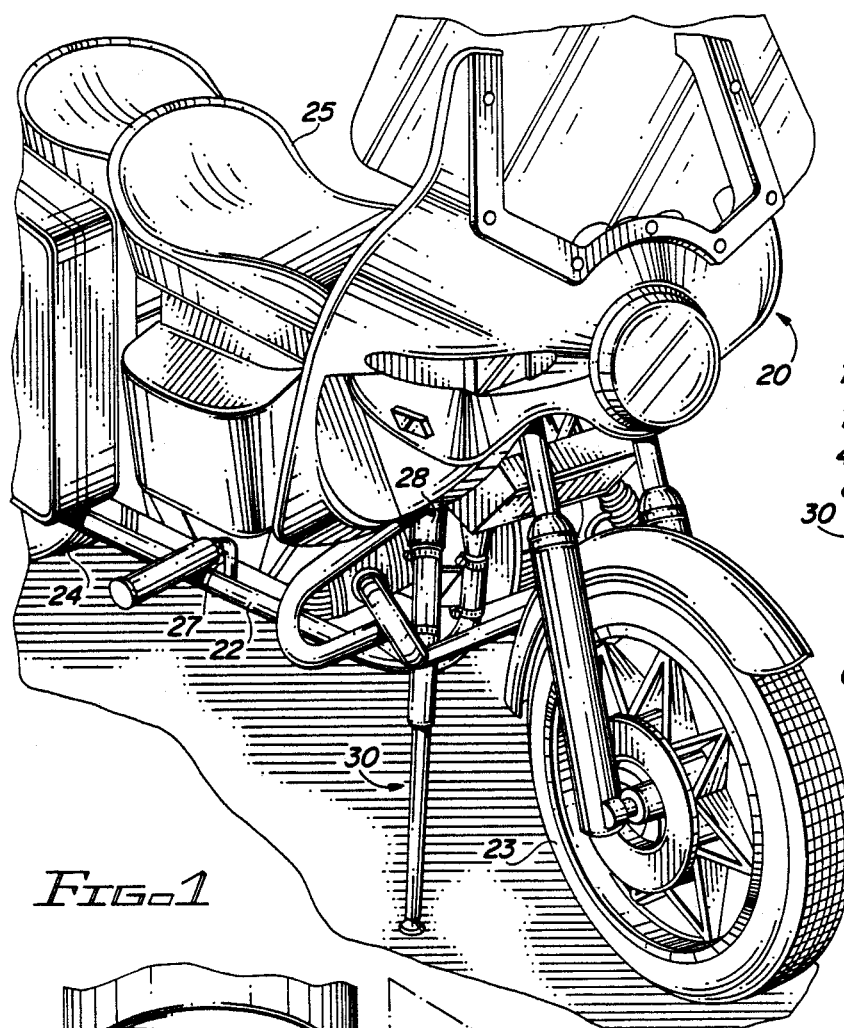
FIG. 1 is a partial perspective view of a motorcycle as it would appear when supported by a stand embodying the principles of the instant invention.

Turning now to the drawings in which like reference characters indicate corresponding elements throughout the several views, attention is first directed to FIG. 1 which illustrates a motorcycle, generally designated by the reference character 20, including frame 22, front wheel 23, rear wheel 24 and seat 25. Typically, frame 22 includes substantially horizontal longitudinal member 27 and forward upright member 28. Although not specifically illustrated, it will be appreciated that motorcycle 20 includes a second mirror image frame component spaced from frame 22. Motorcycle 20, herein set forth for purposes of orientation and explanation in connection with the ensuing description of the instant invention, is intended to be typically representative of conventional commercially available vehicles of the type. Details not specifically illustrated nor described will be readily understood and appreciated by those having regard for the instant subject matter.

While parked, motorcycle 20 is supported in an upright position by a stand, generally designated by the reference character 30, constructed in accordance with the teachings of the instant invention.

Figure 2:
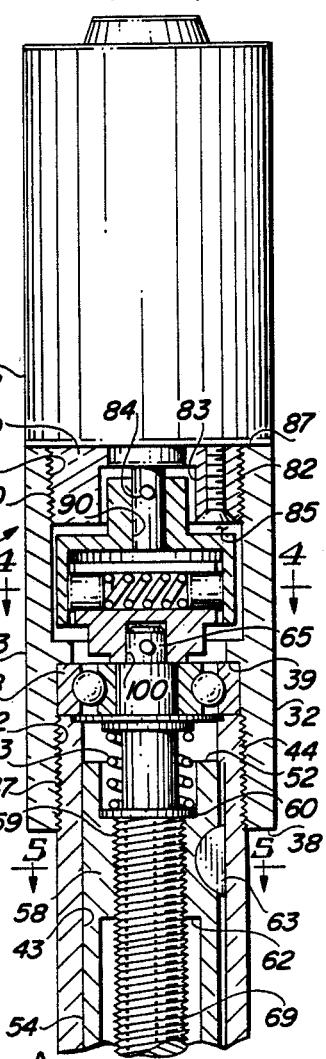
FIG. 2 is an elevation view of the stand seen in FIG. 1, portions thereof being in section taken along the longitudinal axis.

Stand 30, as seen in greater detail with reference to FIG. 2, includes housing 32 which, for ease of manufacture, includes upper and lower generally tubular sections 33 and 34, respectively. Bore 35 extends through upper section 33 between upper end 37 and lower end 38. Inwardly directed downwardly facing annular shoulder 39 resides at an intermediate location within bore 35. Internal threaded section 40 and internal threaded section 42 are carried within bore 35 adjacent ends 37 and 38, respectively.

Bore 43 extends through lower section 34 between upper end 44 and lower end 45. Externally threaded section 47, adjacent upper end 44, is received within internally threaded section 42 for union of upper section 33 and lower section 34. Internal annular groove 48 is formed at lower end 45. Slot 49, as further viewed in FIG. 5, extends longitudinally within bore 43.

Leg 50 having upper or attached end 52 and lower or free end 53, further includes outer surface 54 which is slidably and telescopingly received within bore 43 of housing 32. Leg 50 is a relatively thin-walled hollow structure by virtue of bore 55 extending therethrough. A standard commercially available self-leveling foot 57, such as the one distributed as Model No. P3045 by Vlier Company, carried at the lower end 53 of leg 50 is secured within bore 55 in accordance with standard techniques. Partition 58 having threaded bore 59 extending therethrough resides within bore 55 proximate upper end 52. Upper and lower annular shoulders 60 and 62, respectively, are defined by partition 58. Key 63 carried by leg 50 preferably in a vicinity of partition 58, projects into and is guided by groove 49 to prevent rotation of leg 50.

Shaft 64 having upper end 65 and lower end 67 is rotatably journaled within housing 32 and cammingly engaged with leg 50. Bearing 68, herein illustrated as a conventional roller bearing, includes an outer race which is located in bore 35 and firmly held between shoulder 39 and the upper end 44 of lower section 34. Shaft 64, held within the inner race intermediate threaded portion 69, extends through and is threadedly received within the threaded bore 59 of partition 58. It is noted that intermediate threaded portion 69 is sufficiently larger than shaft 64 to provide a shoulder at either end thereof against which are received, at respective ends upper washer 70 and lower washer 72. The outside diameter of each washer is sufficiently larger than the diameter of threaded section 69 such that washer 70 is capable of abutting upper annular shoulder 60 while lower washer 72 is capable of abutting lower annular shoulder 62. Upper biasing means, a conventional compression coil spring, encircles shaft 64 and resides intermediate washer 70 and the inner race of bearing 68. Lower biasing means, a second coil spring 74 which may be chosen to be the same as coil spring 73, resides intermediate lower washer 72 and a second lower washer 75 which is retained by nut 77 secured to shaft 64 proximate the lower end 67.

A conventional reversible motor 78, such as a commercially available model distributed by Merkle-Korff Company under the designation UM46002524 RND, is carried at the upper end of housing 32. In accordance with the immediately preferred embodiment of the invention there is provided an insert 79 having external thread 80 to which motor 78 is affixed by means of screws 82. Bore 83 accommodates motor shaft 84. After assembly of motor 78 and insert 79, external threads 80 are engaged within threaded section 40 of upper section 33 and the assembly rotated until motor 79 firmly abuts upper end 37.

Figure 3:
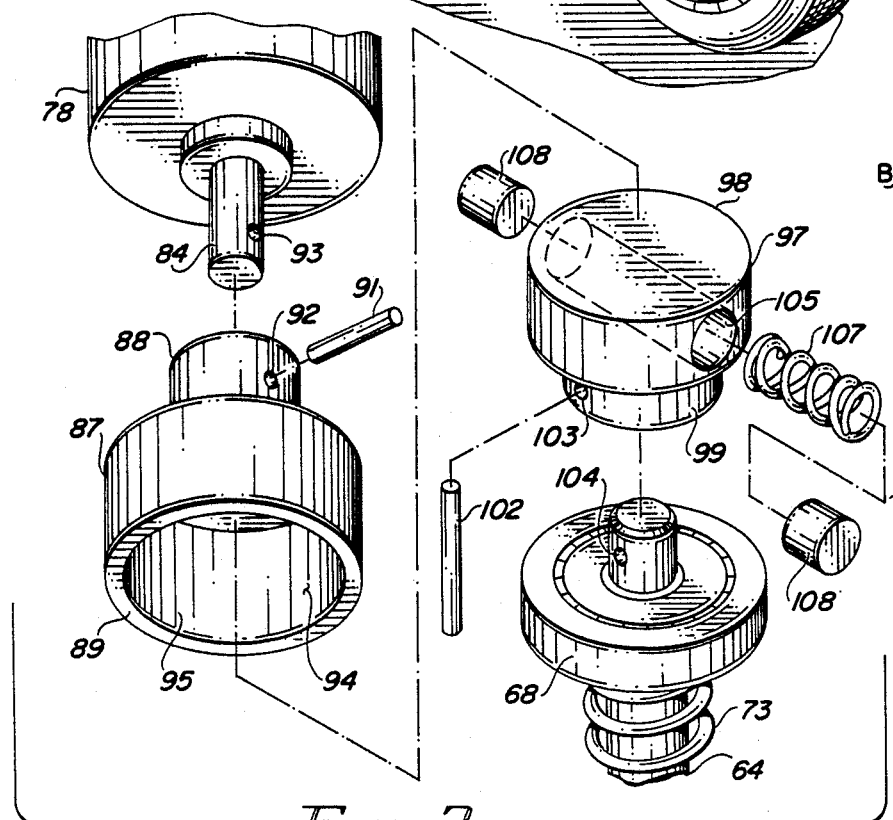
FIG. 3 is an exploded fragmentary perspective view of a preferred drive means useful in connection with the instant invention.

A clutch mechanism for transmitting a predetermined maximum torque drivingly couples motor 78 with shaft 64. The mechanism, as seen in greater detail in FIG. 3, includes female element 87 having upper end 88 and lower end 89. Bore 90 extending from upper end 88 receives motor shaft 84. Pin 91 concurrently passing through transverse aperture 92 in element 87 and transverse aperture 93 in motor shaft 84 drivingly secures the union of the elements. Element 87 further includes counter-bore 94 extending inwardly from lower end 89 and having cylindrical sidewall 95.

Male element 97 having upper end 98 and lower end 99 is sized to be received within bore 95 of female element 87. Axial bore 100, extending inwardly from lower end 99, receives the upper end of shaft 64. Pin 102 concurrently received through aligned transverse apertures 103 and 104 in male element 97 and shaft 64, respectively, drivingly affixes the elements. Bore 105, extending transversely through male element 97, carries compression spring 107 and friction elements 108. Friction pads 108 which may be fabricated of any well known material commonly employed for the fabrication of clutch discs or brake pads slidably disposed within bore 105. Accordingly, spring 107, residing intermediate the friction elements 108, urges the friction pads 108 against sidewall 95 within a force predetermined by the compression of spring 107.

It is noted that certain ones of the elements of stand 30, especially including the bore through housing 32, leg 50, shaft 64, motor 78 and the male and female elements 97 and 87, respectively, of the clutch mechanism are coaxial. Shaft 64 is rotatable in opposite directions in response to motor 78. As a result of the camming action between threaded bore 59 integral with leg 50 and intermediate threaded portion 69 of shaft 64, leg 50 moves in extendible and retractable directions as indicated by the arrowed lines and B, respectively. In FIG. 2, stand 30 is shown in the retracted position. In this position, an equilibrium exists between the force exerted by spring 73 and the frictional engagement between elements 87 and 97 of the clutch mechanism. As the leg is moved in the direction of arrowed line B, spring 73 is compressed thereby storing energy. When the energy stored equals the frictional force between frictional elements 108 and bore 95, movement is automatically ceased. When motor 78 is reversed, the energy stored within spring 73 assists the clutch mechanism to initiate movement of leg 50 in the extendible direction indicated by the arrowed line B.

During extension, in the direction of the arrowed line A, movement is automatically curtailed when an equilibrium is reached between the force of foot 57 against the supporting surface and the frictional coupling means. It is obvious that the weight of the motorcycle bearing upon foot 57 functions as the stored energy to assist the friction coupling means during initial movement in the retracted direction, arrowed line B. Should leg 50 fully extend without foot 57 abutting the supporting surface, movement in the direction of arrowed line A will be automatically stopped as a result of shoulder 62 abutting washer 72 and compressing spring 74. Spring 74, like previously described spring 73, stores energy, creates a counter-force for equilibrium with the frictional drive means and assists during initial movement of the leg in the direction of arrowed line B. During extension and retraction, leg 50 is wiped by annular seal 109 carried within annular groove 48.

A single stand 30 is usable with motorcycle 20 in lieu of the conventional kickstand. Preferably, however, a pair of stands are utilized as illustrated in FIG. 6. A single stand 30 is carried by each frame member 22 on either side of the vehicle. Preferably, the stands are mounted at a slightly divergent angle to provide a wider stance for rear stability. As illustrated herein, motorcycle 20 is parked upon a substantially horizontal support surface 110. As the motorcycle supported by the rider with both feet upon the ground in an upright, nearly vertical position, the stands are lowered manually as will be described presently. As previously described in detail, the extension of each stand will be automatically discontinued when the lower end of the leg firmly abuts the grounds. Similarly, it will be appreciated that the motorcycle may be supported in an upright position upon an irregular or sloping surface 112 as seen in FIG. 7.

Stand 30 may be secured to motorcycle 20 in various ways as will be appreciated by those skilled in the art. For example, frame 20 may be manufactured in such a configuration as to form an integral part of housing 32. Such structure is especially adapted as original equipment manufacture. A preferred mounting bracket, generally designated by the reference character 113 in FIG. 8, is preferred for retrofit to preexisting vehicles. Mounting bracket 113 includes first semi-cylindrical element 114 which is sized and shaped to be received against frame 22. Second semi-cylindrical element 115 is sized and shaped to be received against housing 32. The semi-cylindrical elements are secured to the respective components in any conventional means such as by strap clamps 117. Web 118 extends between the semi cylindrical elements 114 and 115. The web may be deformed, in accordance with standard metal forming techniques, to provide the desired relative angle between frame member 22 and housing 32.

FIGS. 9 and 10 illustrate means for indicating whether the leg is in the extended position or in the retracted position. Shown in housing 32A, having bore 43A, is slidably disposed leg 50A. While corresponding to the previously described embodiment, the immediate embodiment has been simplified for purposes of illustration by the elimination of certain structure not essential to the understanding of the immediate embodiment. A generally planar beveled surface 119 is carried by the upper terminal portion of leg 50A. The beveled portion is angled to extend upwardly inward. A microswitch 120 such as the one distributed by Tandy Corporation as model number 175-709, is carried by housing 32A. Microswitch 120 is a double-pole switch. When leg 50A is in the extended position, beveled surface 119 is removed from switch 120 whereby the switch resides in a first position. As leg 50A reaches the limit of travel in the retracted direction the beveled surface contacts and throws the switch to a second position. The significance of the positions will be explained in further detail presently.

Figure 11:
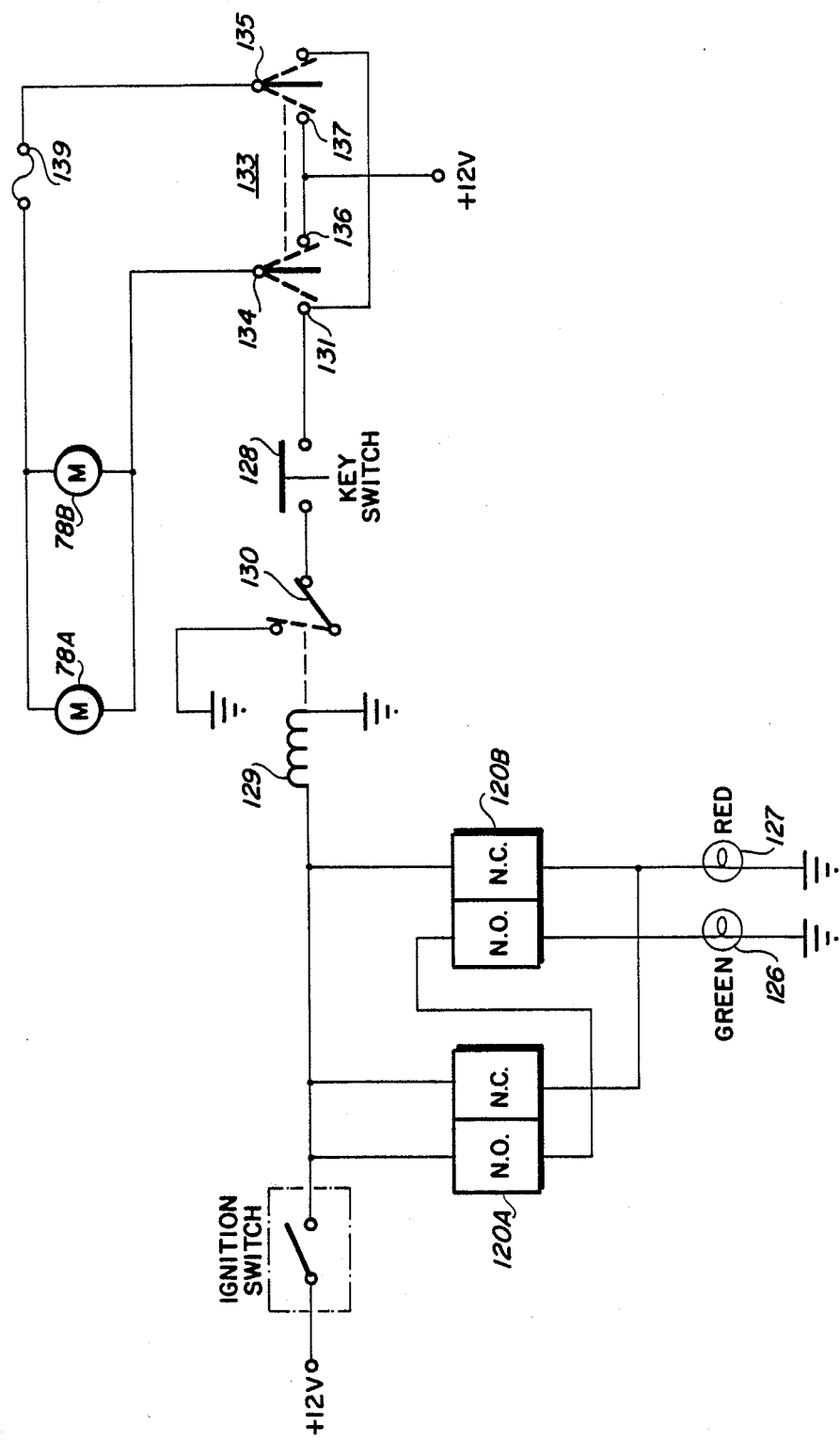
FIG. 11 is a schematic illustrating a preferred means for controlling the stand of the instant invention.

An exemplary schematic for the electrical circuit which achieves functions described above in conjunction with a visual indication of immediate leg position and also providing a safety interlock function is illustrated in FIG. 11. As previously noted, indicator switch 120, as illustrated in FIG. 9, is a DPDT type. Thus, if an indicator switch 120 is provided for each of the left and right mechanisms, there will be available normally open and normally closed sections of each switch. Therefore, referring particularly to FIG. 11, indicator switch 120A for the right leg mechanism and indicator switch 120B for the left leg mechanism each have normally open and normally closed sections. Ignition switch 125 is connected directly to the motorcycle plus 12 volt DC provided by the vehicle battery. The normally open sections of the indicator switches 120A, 120B are connected in series with green indicator lamp 126 which has its other terminal connected to ground. However, the normally closed sections of the switches 120A, 120B are connected in parallel and to one terminal of a red indicator lamp 127 which also has its other terminal connected to ground. Therefore, only when both switches 120A and 120B are actuated (i.e., when both legs are fully retracted), will the green lamp be energized to indicate that it is safe to move off on the motorcycle. Conversely, if either of the indicator switches 120A, 120B is not actuated, which would be the case if either one of the right or left legs is not fully retracted, a circuit is completed through either or both of the normally closed sections of the switches to energize the red indicator lamp 127 providing an indication to the operator that it is not yet safe to move off on the motorcycle since one of the other or both of the legs are not yet fully retracted.

The circuit illustrated in FIG. 11 also provides an interlock function which prevents actuation of the retraction and/or extension of the left and right legs unless both the ignition switch 125 and a key switch 128 are both actuated. When the ignition switch 125 is actuated, a relay coil 129 is energized to throw contacts 130 to the position at which a power ground connection is provided to one side of the key switch 128. If the key switch 128 is closed, ground potential is applied to contact terminals 131 and 132 of an actuator switch assembly 133 which is normally biased (as, for example, by spring loading) to a central position at which power contact terminals 134 and 135 are open. Contact terminals 136, 137 are connected to plus 12 volt DC potential from the motorcycle electrical system.

Left and right actuation motors 78A, 78B, are connected in parallel with one terminal of each being connected to the power contact terminal 134 and the other terminal of each being connected, through fuse 136, to the other power contact terminal 135.

In operation, assuming the ignition switch is actuated, the relay coil 129 will be energized to apply a ground potential to one terminal of key switch 128 which, if closed, supplies ground potential to the contacts 131 and 132 of the contact assembly 133. Therefore, if the contact assembly 133 is manually actuated to move both movable contact members in one direction, 12 volts DC is applied across the motors 78A and 78B to extend the left and right legs in unison. Conversely, if the contact assembly 133 is manually actuated to throw the contacts to their alternative operative positions, the polarity of the voltage applied across the motor. 78A, 78B is reversed to retract the left and right legs. Thus, it will be understood, that the right and left leg actuation mechanism can only be operated if both the ignition switch 125 is on and the key switch 128 is closed. If the ignition switch 125 is on, the green indicator lamp 126 will only be illuminated if the left and right legs are fully retracted. If either of the legs is not fully retracted, the red indicator lamp 127 will be illuminated to provide an indication to the operator that the legs must be retracted before operation of the motorcycle can be undertaken.

Various changes an modifications to the embodiments herein chosen for purposes of illustration will readily occur to those skilled in the art. For example, while motor 78 has been specifically designated as DC electric motor, it is apparent that other sources of power may be substituted. One such source of alternate power is a pneumatic motor along with the required pump and other ancillary equipment. To the extent that such modifications and variations do not depart from the spirit of the invention, they are intended to be included within the scope thereof which is limited only by a fair assessment of the following claims.

Having fully described and disclosed the present invention and alternately preferred embodiments thereof in such clear and concise terms as to enable those skilled in the art to understand and practice the same, the invention claimed is.

1. A stand system especially adapted for use in combination with a motorcycle for automatically compensating for irregularities of the support surface to hold the motorcycle in a substantially upright position, said stand system comprising:
   (A) a housing securable to the motorcycle;
   (B) a leg extensively carried by said housing and having a free end for contacting said support surface;
   (C) selectively reversible drive means carried by said housing, said drive means transmitting a maximum drive force of a value which is less than the force required to lift the motorcycle from the support surface;
   (D) cam means responsive to the drive force of said drive means for alternately moving said leg in an extending direction and in a retracting direction;
   (E) said drive means including:
      1. a reversible d-c motor carried by said housing;
         a. a first contact assembly section having a common terminal connected to a first electrical side of said reversible d-c motor;
         b. a second contact assembly section having a common terminal connected to a second electrical side of said d-c motor;
         c. first terminals of each of said first and second contact assembly sections being connected to a voltage source; and
         d. second terminals of each of said first and second contact assembly sections being selectively connected to motorcycle ground potential; and
      2. first and second complementary elements of a frictionally engaged coupling pair;
         a. one of said complementary elements including an engagement surface;
         b. another of said complementary elements including:
            i. a friction element; and
            ii. biasing means for urging said friction element into contact with said engagement surface;
         c. means drivingly coupling one of said complementary elements with said motor; and
         d. means drivingly coupling another of said complementary elements to said cam means;
   (F) said cam means including:
      1. a helical cam journaled in said housing for rotation in alternate directions in response to the drive force of said drive means; and
      2. a cam follower carried by said leg and drivingly engaged with said helical cam;
   (G) retraction stop means for limiting the movement of said leg in the retracting direction; and
   (H) extension stop means for limiting the movement of said leg in the extending direction;
whereby, when said contact assembly sections are actuated in a first direction, voltage is applied across said d-c motor in a first polarity to energize said motor to extend said leg and, when said contact assembly sections are actuated in a second direction, voltage is applied across said d-c motor in a second direction to energize said motor to retract said leg.

2. The stand system of claim 1, wherein said retraction stop means includes a compression spring for storing energy in response to movement of said leg in the retracting direction such that the stored energy creates a progressively increasing counterforce opposing the drive force of said drive means, movement of said leg being arrested when substantial equilibrium is reached between said driving force and said counterforce, said counterforce thereafter assisting the drive force of said drive means to initiate movement of said leg in the extending direction during extensive operation of said stand.

3. The stand system of claim 1, wherein:
(A) one of said elements includes a bore having a cylindrical surface which defines said engagement surface; and
(B) the other of said elements includes a portion residing within said bore and having
 1. a guide substantially radial to said cylindrical surface,
 2. said friction element slidably disposed within said guide, and
 3. said biasing means urging said friction element into contact with said cylindrical surface.

4. The stand of system claim 2, wherein:
(A) one of said elements includes a bore having a cylindrical surface which defines said engagement surface; and
(B) the other of said elements includes a portion residing within said bore and having
 1. a guide substantially radial to said cylindrical surface,
 2. said friction element slidably disposed within said guide, and
 3. said biasing means urging said friction element into contact with said cylindrical surface.

5. The stand system of claim 3 which further includes an indicator and interlock circuit comprising:
(A) an indicator switch having independent normally open and normally closed sections, said indicator switch being situated for actuation only when said leg has moved to the limit in said retraction position;
(B) means connecting a source of voltage to each section of said switch;
(C) a red indicator lamp connected to said normally closed section to indicate that said leg is not fully retracted; and
(D) a green indicator lamp connected to said normally open section to indicate that said leg is fully retracted.

6. The stand system of claim 4 which further includes an indicator and interlock circuit comprising:
(A) an indicator switch having independent normally open and normally closed sections, said indicator switch being situated for actuation only when said leg has moved to the limit in said retraction position;
(B) means connecting a source of voltage to each section of said switch;
(C) a red indicator lamp connected to said normally closed section to indicate that said leg is not fully retracted; and
(D) a green indicator lamp connected to said normally open section to indicate that said leg is fully retracted.

* * * * *